United States Patent [19]
Bee

[11] Patent Number: 5,335,447
[45] Date of Patent: Aug. 9, 1994

[54] THERMALLY EFFICIENT INTEGRATED GREENHOUSE SYSTEM

[76] Inventor: Richard A. Bee, 1641 Mount Vernon, St. Charles, Mo. 63303

[21] Appl. No.: 798,523

[22] Filed: Nov. 26, 1991

[51] Int. Cl.$^5$ ............................................. A01G 9/00
[52] U.S. Cl. ........................................................ 47/17
[58] Field of Search .............. 47/17 I, 17 FM, 17 RL, 47/17 RM, 17 EC, 17 MS, 17 MD

[56] References Cited

U.S. PATENT DOCUMENTS

| | | | |
|---|---|---|---|
| Re. 32,523 | 10/1987 | Resnick et al. | 126/633 |
| 4,132,217 | 1/1979 | Rom et al. | 126/675 |
| 4,290,242 | 9/1981 | Gregory, Jr. | 47/17 I |
| 4,292,956 | 10/1981 | Wasserman | 126/684 |
| 4,301,626 | 11/1981 | Davis et al. | 47/17 I |
| 4,318,251 | 3/1982 | Winkler | 47/17 I |
| 4,352,259 | 10/1982 | Smith et al. | 47/17 I |
| 4,462,390 | 7/1984 | Holdridge | 52/80 |
| 4,790,478 | 12/1988 | Sauvageau | 47/17 EC |

FOREIGN PATENT DOCUMENTS

| | | | |
|---|---|---|---|
| 1911301 | 6/1969 | Fed. Rep. of Germany | 47/17 RM |
| 8100994 | 10/1982 | Netherlands | 47/17 I |
| 1385261 | 2/1975 | United Kingdom | 47/17 |
| 2215357 | 9/1989 | United Kingdom | 47/17 MD |

Primary Examiner—Ramon S. Britts
Assistant Examiner—Joanne C. Downs
Attorney, Agent, or Firm—Shenier & O'Connor

[57] ABSTRACT

A thermally efficient integrated greenhouse system in which thermally insulated walls support an arcuate transparent roof having the configuration of an arc of a quarter-circle with the long axis of the structure oriented in an east-west direction with the inner surface of the north wall reflective. A thermal barrier made up of a plurality of interconnected tubes of metalized plastic is provided with means for inflating the tubes to extend the barrier along a chord of the arcuate roof and with means for exhausting the tubes to retract the barrier. Solar panels along the south side of the greenhouse supply heat to a heat storage medium contained in a bin in the greenhouse. When heat is called for, a plenum in the bin above the heat storage medium is pressurized to lift the bin lid.

9 Claims, 4 Drawing Sheets

FIG. 1
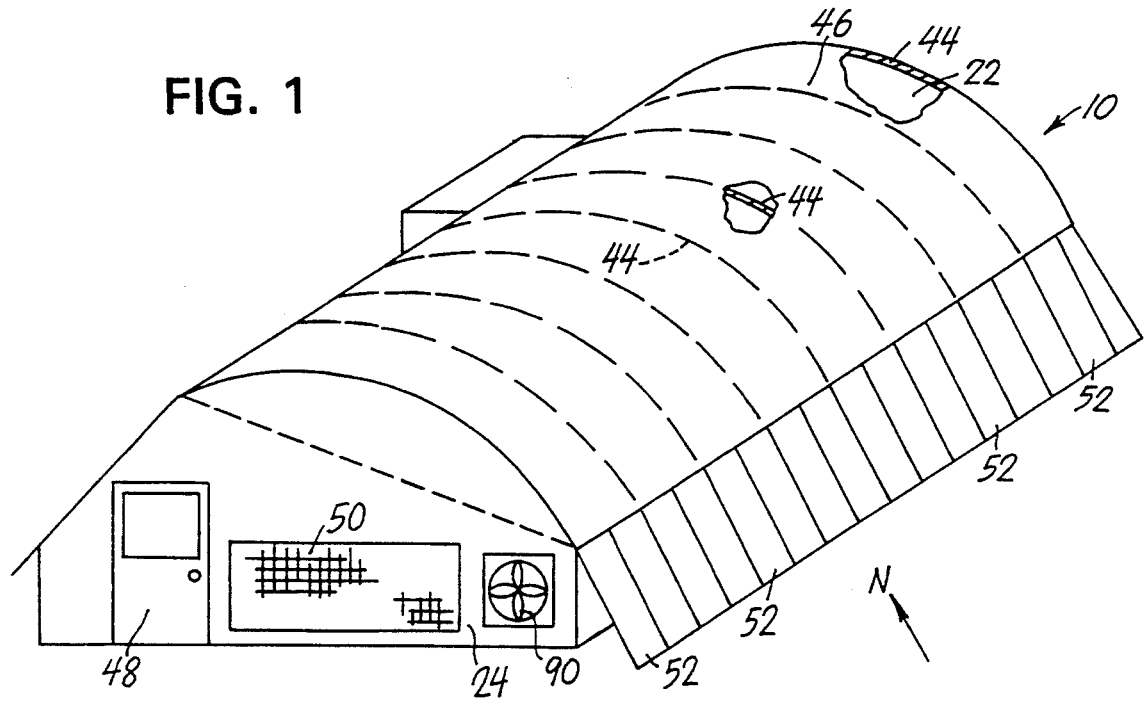
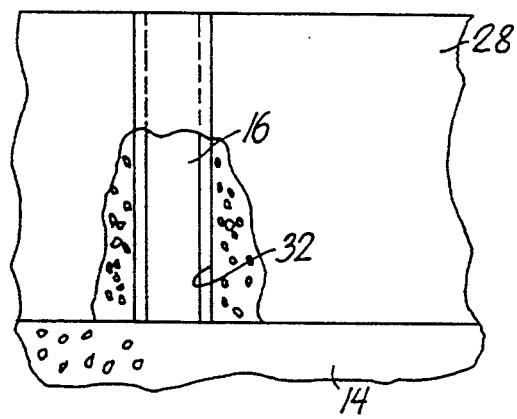
FIG. 3
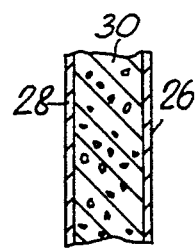
FIG. 4

THERMALLY EFFICIENT INTEGRATED GREENHOUSE SYSTEM

FIELD OF THE INVENTION

The invention is in the field of greenhouses and relates more particularly to an integrated greenhouse system which is more efficient than are greenhouse systems of the prior art.

BACKGROUND OF THE INVENTION

There are known in the prior art many and various forms of greenhouses for the indoor cultivation of plants. Most of these greenhouses do not efficiently take advantage of the available sunlight. They involve excessive reliance on fossil fuels to maintain the temperature within the greenhouse at an acceptable level. In addition, they use an excessive amount of water for the result achieved.

SUMMARY OF THE INVENTION

One object of my invention is to provide a thermally efficient integrated greenhouse system which overcomes the defects of greenhouse systems of the prior art.

Another object of my invention is to provide a thermally efficient integrated greenhouse system which makes maximum use of available natural light during a twenty-four hour period.

A further object of my invention is to provide a thermally efficient integrated greenhouse system which minimizes fossil fuel use.

Yet another object of my invention is to provide a thermally efficient integrated greenhouse system incorporating a unique solar heating system.

A still further object of my invention is to provide a thermally efficient integrated greenhouse system which is more effectively insulated than are greenhouses of the prior art.

Yet another object of my invention is to provide a thermally efficient integrated greenhouse system having reduced water consumption as contrasted with greenhouse systems of the prior art.

Other and further objects of my invention will appear from the following description.

BRIEF DESCRIPTION OF THE DRAWINGS

In the accompanying drawings to which reference is made in the instant specification and which are to be read in conjunction therewith and in which like reference numerals are used to indicate like parts in the various views:

FIG. 1 is a perspective view of my thermally efficient integrated greenhouse system.

FIG. 3 is a fragmentary elevation with parts broken away of a portion of the wall structure of my thermally efficient integrated greenhouse system.

FIG. 4 is a fragmentary sectional view of the portion of the wall section illustrated in FIG. 3.

DESCRIPTION OF THE PREFERRED EMBODIMENT

Figure 2:
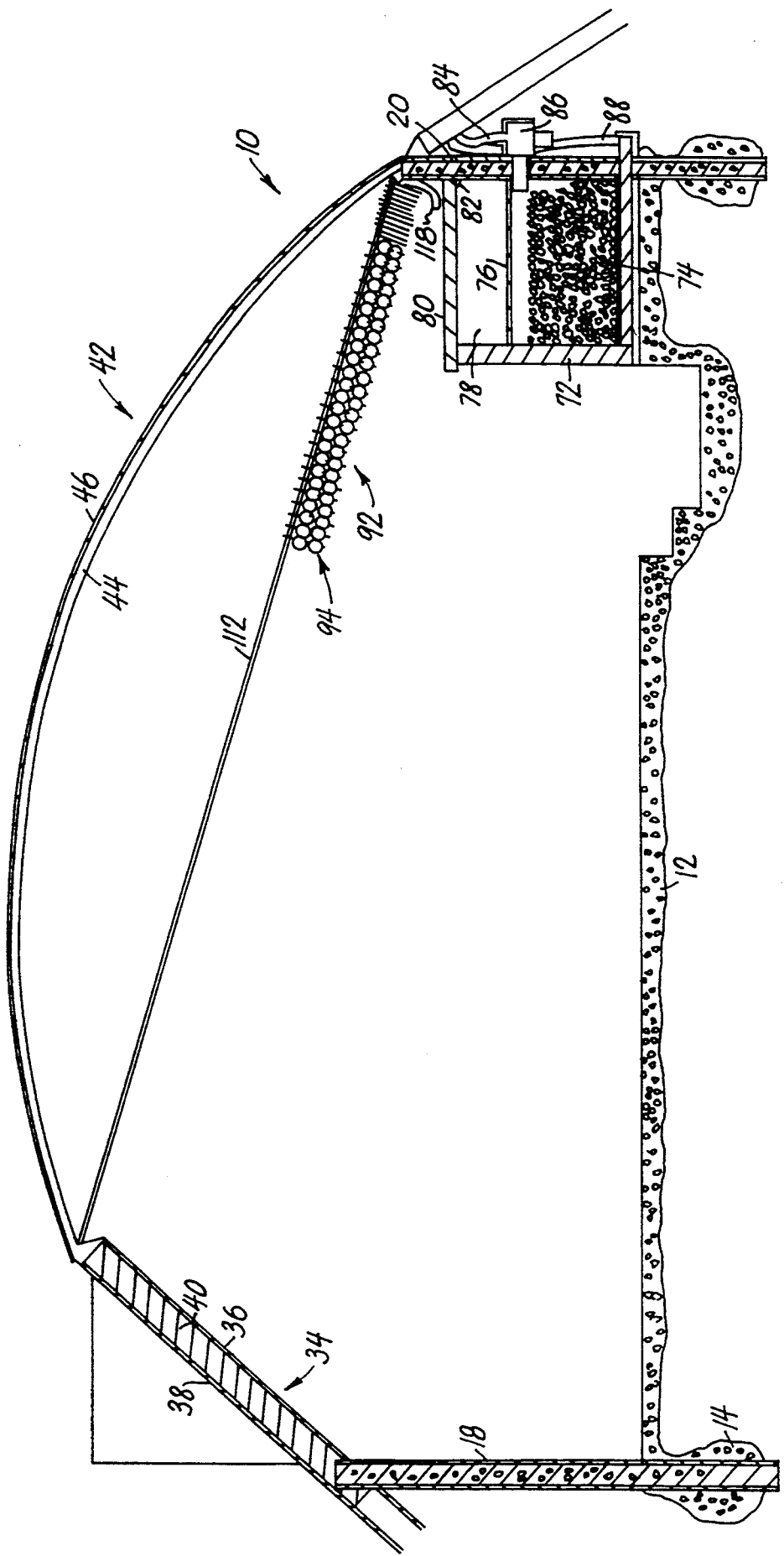
FIG. 2 is a sectional view of my thermally efficient integrated greenhouse system.

Referring now more particularly to FIGS. 1 to 4 of the drawings, my thermally efficient integrated greenhouse system indicated generally by the reference character 10 includes a poured concrete floor 12 surrounded by a footing 14 of suitable depth. I form the footing 14 with a plurality of spaced posts 16 received by the walls of the greenhouse in a manner to be described.

The greenhouse 10 includes a vertical north wall section 18, a south wall 20, an east wall 22 and a west wall 24. It is to be noted that contrary to the usual north/south orientation, I orient my greenhouse in an east/west direction. This orientation is to take maximum advantage of the available sunlight in winter, depending upon the location of the greenhouse. For example, for a proposed location in Rolla, Mo., the maximum solar altitude at noon on January 21 is 30°. Owing to that fact, much of the sun's radiation is reflected. Greenhouses with an east/west orientation may have light levels up to 12% higher than for a greenhouse with a north/south orientation. In addition to that fact, this greenhouse orientation effectively accommodates the solar heating system to be described.

Owing to low purchasing construction costs, a quonset hut configuration has been adopted for many greenhouses. As is known, the roof of a quonset hut is a half-circle in cross section to afford the strength necessary to withstand snow and wind loads. One disadvantage of such arrangement is the lack of head room along the sides of small, narrow houses or excessive and wasted ceiling height for larger, wider houses. In the larger houses this excessive ceiling height translates directly into an unfavorable glazed surface area to floor area ratio. Further, owing to the concentration of heat in the upper area, heat loss is excessive.

In my thermally efficient integrated greenhouse system, I provide an arcuate roof section 42 made up of a transparent plastic sheet 46 supported by a plurality of spaced ribs which may, for example, be curved aluminum I-beams. An inclined north wall section 34 having inner and outer skins 36 and 38 with insulation therebetween, connects the north edge of the roof 42 to the vertical north wall section 18. With such an arrangement, as the ceiling height is lowered the width of the floor approaches the chord length of the quarter-circle of the arcuate roof 42. This results in an increase in floor area as compared with curved roof area of approximately 41% over a structure in which a half-circle roof is employed. This, when added to the floor space created by the angled north wall will create in effect a 69% increase in floor space. This increase in floor space for the same amount of glazed surface area can be directly correlated with an increase in fuel efficiency.

Referring now to FIGS. 3 and 4, the vertical walls of the greenhouse are constructed by molding four inches of polyurethane foam 30 between two lightweight sheets 26 and 28 of metal, for example. In molding the walls, I leave voids 32 at appropriate locations to receive the cast in posts 16. In constructing the greenhouse, the walls may be assembled on the posts 16 by sliding the walls over the posts with the posts disposed in the voids 32. The ribs 44 or extensions thereof in the inclined wall roof portion 34 may be tied directly to the posts 16 so that the latter carry the roof loads.

The east and west walls 22 and 24 may be provided with access doors 48 and with evaporative cooling pads 50 of a type known to the art.

Figure 5:
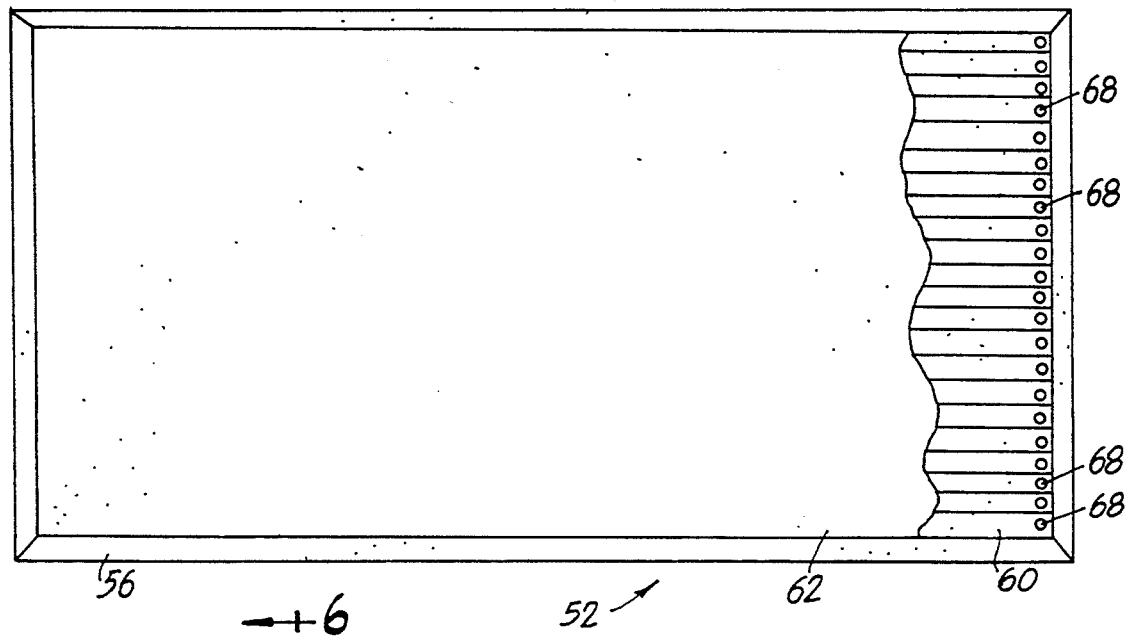
FIG. 5 is a top plan with a part broken away of one of the solar panels of my thermally efficient integrated greenhouse system.
Figure 6:
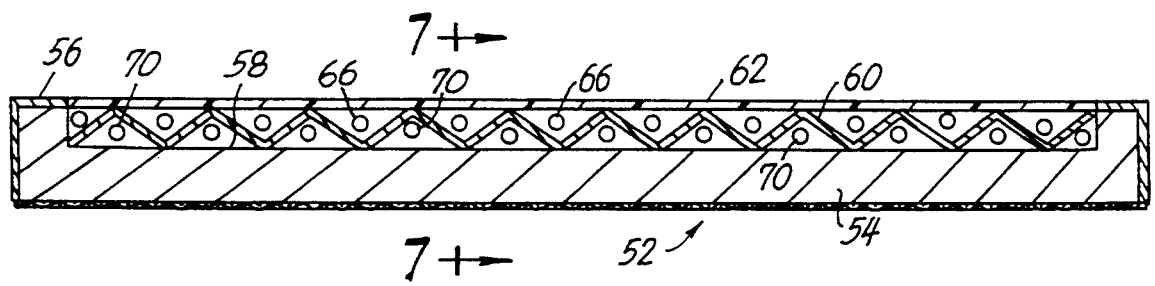
FIG. 6 is a sectional view of the panel shown in FIG. 5 taken along the line 6—6 of FIG. 5 and drawn on an enlarged scale.
Figure 7:
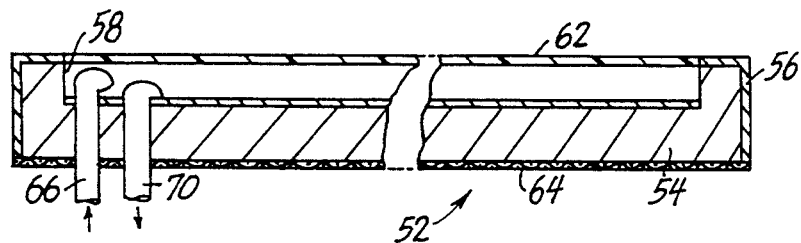
FIG. 7 is a sectional view of the panel shown in FIG. 5 taken along the line 7—7 of FIG. 6.

The south wall 20 of my greenhouse supports a plurality of inclined solar panels 52. Referring now to FIGS. 5 to 7, each of the panels 52 includes a one piece molded polyurethane body 54 surrounded by a frame 56. I form the body 54 with a rectangular recess in its upper surface for receiving an absorber body 60 which may be formed from corrugated aluminum. The outer or exposed surface of the absorber 60 is painted flat black. I provide each of the panels 52 with a cover 62 of 8 mm double glazed polycarbonate. Preferably, a wire mesh varmint guard 64 is secured over the under surface of each of the panels 52.

Air to be heated is fed to the upper surface of the absorber 60 between each pair of adjacent corrugations by means of inlet pipes 66. This air travels along the upper surface of the absorber 60 from the left end thereof, as viewed in FIG. 5, to the right end at which it passes through holes 68 in the sheet to the under surface thereof. The air then travels from right to left under the absorber 60 to the left end, as viewed in FIG. 5, from whence it is removed by pipes 70. It will readily be appreciated that in the course of its passage in heat exchange relationship with the absorber 60, the air is heated.

Referring again to FIG. 2, my system includes a rock storage box 72 extending along the full length of the south wall 20 of the greenhouse 10. Box 72 is adapted to receive a heat storage medium, such for example as crushed limestone rock 74. A thin aluminum sheet 76 extending across the box above the rocks 74 forms a plenum chamber 78 or heat duct. I mount an insulated cover or lid 80 on a hinge 82 on the south wall 20. Hot air from the pipes 70 is collected in a conduit 84 and is blown across the top of the storage rocks 74 by a blower 86. A conduit 88 carries cooler air from the bottom of the box back to the inlet pipes 66 of the panels 52. I provide a suitable control for energizing the blower or blowers 86 when the temperature in the solar collectors is higher than the temperature within the storage bin 72.

I provide heaters with blowers 90, one of which is shown in FIG. 1, at each end of the bin 72. When heat is called for by a two-stage thermostat (not shown), only the blowers 90 are turned on to pressurize the plenum chamber 78. The resultant pressure opens the lid 80 a preset amount to permit heat from the storage rocks to escape into the greenhouse. In the event that there is insufficient energy remaining in the rocks to satisfy the heating requirements, the backup heaters are turned on by the second stage of the thermostat.

Figure 8:
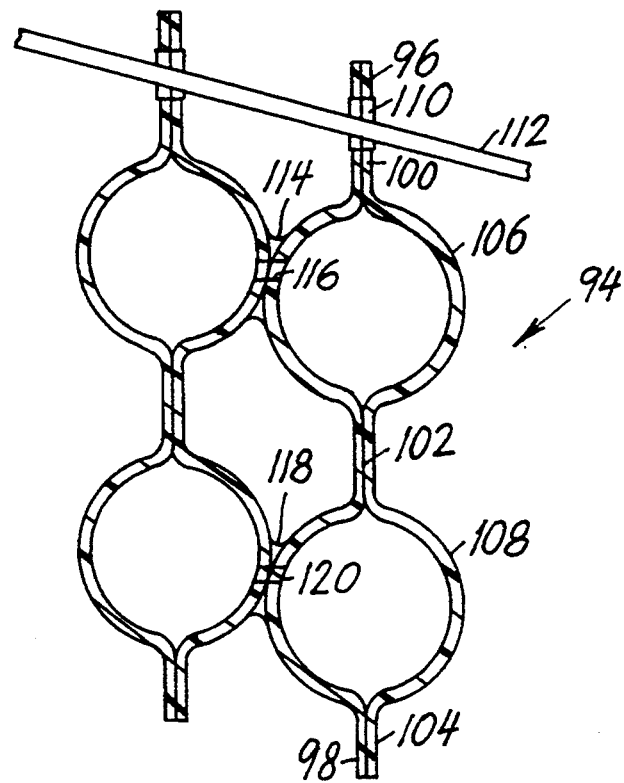
FIG. 8 is a fragmentary sectional view of the retractable insulating curtain of my thermally efficient integrated greenhouse system.

Referring now to FIGS. 2 and 8, my system includes an extendible and retractible thermal barrier indicated generally by the reference character 92 made up of a plurality of individual inflatable elements, each of which is indicated generally by the reference character 94.

Each element 94 is made up of two 1.5 mil thick aluminized mylar sheets 96 and 98 which are cut and adhered to each other along lines 100, 102 and 104, so as to form a pair of inflatable tubes 106 and 108. I adhere adjacent tubes 106 to each other by means of a suitable adhesive 114. In the region of the adhesive, I provide a plurality of openings 116 which permit the passage of air between adjacent tubes 106. Similarly, adjacent tubes 108 are adhered to each other by adhesive 118. Holes 120 connect the interiors of adjacent tubes.

The adhered upper ends of each of the members 94 receives a plurality of spaced grommets 110 which are received by spaced cables 112 to support the curtain 92 for movement between its extended and retracted conditions. It will readily be seen that the cables 112 form chords of the arcuate roof section 42.

During daylight hours the curtain 92 normally occupies a retracted position in which each of the elements 94 assumes a flattened shape as shown at the right-hand side of the curtain 92 in FIG. 2. Moreover, in this condition of the curtain it does not interfere with sunlight coming into the greenhouse through the skin 46.

I provide my system with means for inflating the members 94 to extend the curtain 92 over the transparent roof 42 and for retracting the curtain by withdrawing air from the members 94 at the proper time.

Figure 9:
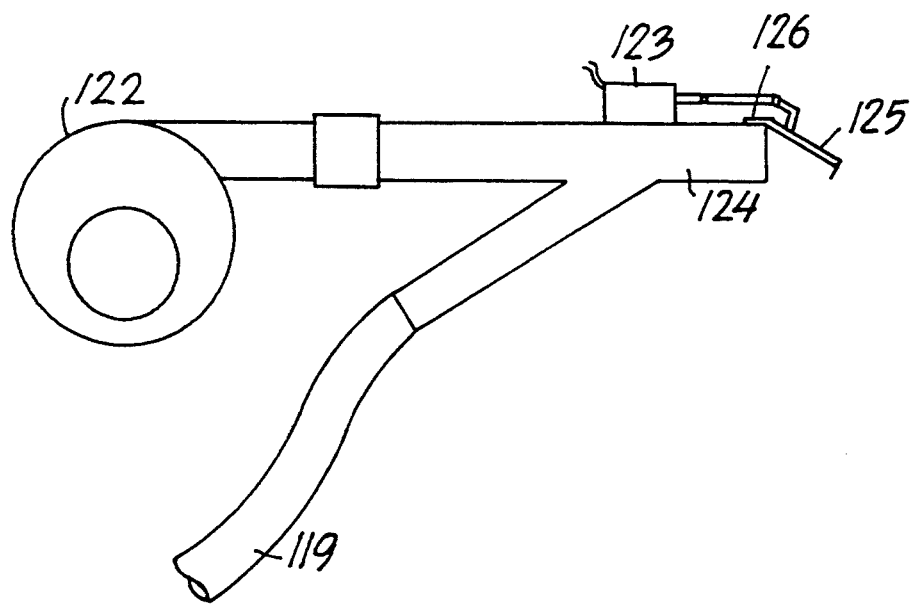
FIG. 9 is a schematic view of one form of control which might be used to operate the insulating curtain of my thermally efficient integrated greenhouse system.

Referring now to FIG. 9, the pipe 119 which is adapted to supply air to and to exhaust air from the members 94 may, for example, be connected to the extreme right-hand member 94 as viewed in FIG. 2. A pump 122 is adapted to be energized both to supply air to and to cause air to be exhausted from the members 94 through the pipe 119.

The curtain operating system includes an air blower or pump 122, which draws its inlet air from outside the greenhouse structure, thus minimizing the buildup of condensate moisture inside the tubes 106 and 108, a solenoid valve 123, a venturi pump 124, a flapper valve 125, and a closer spring 126. In operation, the blower 122 remains continuously energized or in the "on" position 24 hours a day. When the curtain 92 is to be inflated, solenoid 123 is deenergized or turned "off". Thus, the flapper valve 125 is closed and held closed by spring 126. Under this condition the venturi pump 124 does not act as a pump as air is then forced to exit through tube 119. Air supplied by line 119 to the bodies 94 causes the tubes 106 and 108 thereof to be inflated. In the course of this action, air passes from tube to tube through ports 116 and 120. As a result, the members 94 are expanded from their flat state and are gradually moved upwardly along the cables 112 until the curtain 92 covers the entire area of the curved transparent roof section 24.

When it is desired to retract the curtain 92, the solenoid 123 is energized, thus opening flapper valve 125. The venturi pump 122 now acts as a pump and as is known in the art this action causes a reduced pressure which causes air to be drawn from line 118 and thus from bodies 94. This causes the tubes 106 and 108 to return to their flattened condition, thus retracting the curtain 92 into the stowed position and allowing light to enter the greenhouse through the transparent roof section 42.

While I have described a specific arrangement for activating and controlling the thermal barrier 92, it will readily be appreciated that other suitable arrangements might be employed.

The orientation of my greenhouse and the arrangement of the transparent roof section 42 increase light levels within the greenhouse by increasing the angle of incidence of sun in the winter. In addition, I make the inner surface of the north wall 18 of a reflective material so that incident sunlight is reflected back into the greenhouse.

In operation of my thermally efficient greenhouse system, during the daytime the inflatable thermal barrier or curtain 92 is retracted with all of the elements 94 assuming a flat condition so that the entire curtain does not interfere with the entry of sunlight through the curved roof section 42. In this connection, it is to be noted that the cables 112 which support the curtain elements 94, also serve to strengthen the structure of ribs 44 and properly direct loads through the inclined roof portion 34 onto the posts 16 of the north wall 18.

As has been pointed out hereinabove, when the barrier 92 is to be rendered operative during the nighttime, solenoid 123 is positioned to cause air to pass directly from the pump 122 to the line 118 to inflate the tubes 106 and 108. As the tubes are inflated, the members 94 move upwardly along the cables 112 to complete the barrier. Conversely, when it is desired to retract the barrier 92, the solenoid 123 is actuated to cause the venturi pump 124 to draw air out of the cylinders 106 and 108. During the hours of sunlight, the elements 60 of the solar panels 52 are heated. When the temperature within the heat storage chamber 72 drops below that of the panels 52, blower 86 is energized to cause hot air from the outlet pipes 70 to be blown over the bed of rocks. Relatively cooler air passes from the bottom of the chamber through conduit 88 and pipes 66 to the upper surface of the collector 60.

When the control system calls for heat, the blowers 90 first are energized to pressurize the chamber 78 to lift the lid 80 to introduce hot air into the greenhouse. If there is not sufficient heat stored in the rocks 74, auxiliary heaters are activated to provide the necessary additional heat.

The reduction of heat loss by the use of my thermal barrier 92 can readily be demonstrated from the relationship $$Heat\ Loss = AU\Delta tT \qquad (1)$$

where
- A is the surface area of the roof
- U is the loss factor of the material of which the roof is formed
- $\Delta t$ is the temperature differential from inside to outside and
- T is the time in hours.

For Lexan, which is the registered trademark of General Electric Co. for polycarbonate resin, of the thickness specified above, the manufacturer gives a value of U of 0.64 Btu/(hr) (ft$^2$) (°F.). Thus, for a surface area of the roof 42 of 2,160 ft$^2$, a temperature differential of 50° F. for a twelve hour period, the heat loss through the roof 42 is 829,440 Btu.

My thermal barrier has a U factor of 0.43 Btu/(hr) (ft$^2$) (°F.). Using the relationships from pages 357 and 359 of the 1972 ASHRAE Handbook of Fundamentals, I calculate the R factor of the roof and thermal barrier from the relationship R = 1/U so that the factor $R_r$ for the roof is 1.56 and the Rb for the barrier is 2.33. The overall U factor is then calculated from $$U_o = \frac{1}{R_r + R_b} = 0.26\ Btu/(hr)(ft^2)(°F.) \qquad (2)$$

The heat loss for 2,160 ft$^2$, a temperature differential of 50° F. and a twelve hour period becomes 336,960 Btu or a reduction of 60%. It is to be noted that this calculation is somewhat conservative as it does not take into account the insulating value of the dead air space between the barrier 92 and the roof 42.

It will be seen that I have accomplished the objects of my invention. I have provided a thermally efficient integrated greenhouse system which overcomes the defects of greenhouses of the prior art. My system takes maximum advantage of the natural light available during a 24 hour period. It minimizes fossil fuel use. It incorporates a unique solar heat system, as well as a unique thermal barrier for preventing the escape of heat during the night. It reduces the amount of water consumed as compared with greenhouse systems of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. An integrated greenhouse system including in combination a greenhouse comprising a pair of insulated side walls, a pair of insulated end walls and a transparent roof supported by said walls, an extendible and retractible thermal barrier within said greenhouse below said roof, said barrier comprising a plurality of elongated inflatable tubes, means supporting said tubes below said roof for sliding movement of the tubes along a path transversely of the length of the tubes from a retracted condition of said barrier in which said tubes are deflated to an extended condition of said barrier as said tubes are inflated, said barrier comprising at least one layer of adjacent tubes, the lengths of which extend across the barrier, means forming bonds between said adjacent tubes in the direction of the lengths thereof, means forming respective pluralities of spaced air passages in the regions of said bonds between said adjacent tubes, means for alternatively supply air to at least one of said tubes during the daytime to cause said tubes to be successively inflated through said passages to extend the barrier and to exhaust air during the night from at least one of said tubes to deflate said tubes to retract the barrier, a heat storage box within said greenhouse, a heat storage medium in said box, a plurality of solar panels adapted to be heated by sunlight, means for conducting heat from said panels to said heat storage medium and means for supplying heat from said storage medium to the inside of said greenhouse.

2. A system as in claim 1 in which said roof has a configuration of approximately one-quarter of a circle, said side walls supporting said roof with one edge higher than the other to increase the angle of incidence of sunlight and reduce reflection.

3. A system as in claim 2 in which the inner surface of the side wall adjacent to said one edge is reflective.

4. A system as in claim 3 in which said greenhouse has the long axis of the greenhouse oriented east-west whereby said side wall adjacent to said one edge is a north wall.

5. A system as in claim 1 in which said roof is arcuate and in which said tube supporting means supports said tubes for movement along a chord of said arc.

6. A system as in claim 1 in which said means for extending said barrier comprises a pump for supplying air to said tubes and said means for retracting said barrier comprises a venturi pump for exhausting air from said tubes.

7. A system as in claim 1 in which said tubes are formed from metallized plastic.

8. A system as in claim 1 including means forming a plenum chamber in said box above said heat storage medium and a hinged lid on said box, and means for supplying heat from said storage medium to the inside of said greenhouse comprising means for pressurizing said plenum chamber to raise said lid.

9. A system as in claim 1 in which each of said solar panels comprises a heat collecting plate and means for producing a flow of air across one side of the plate from one end to the other and a return flow across the other side.

* * * * *

UNITED STATES PATENT AND TRADEMARK OFFICE
CERTIFICATE OF CORRECTION

PATENT NO. : 5,335,447
DATED : August 9, 1994
INVENTOR(S) : Richard A. Bee

It is certified that error appears in the above-indentified patent and that said Letters Patent is hereby corrected as shown below:

Column 6, line 43, Claim 1 -

"supply" should read -- supplying --.

Signed and Sealed this

Twenty-seventh Day of September, 1994

Attest:

BRUCE LEHMAN

Attesting Officer

Commissioner of Patents and Trademarks